Patented May 17, 1932

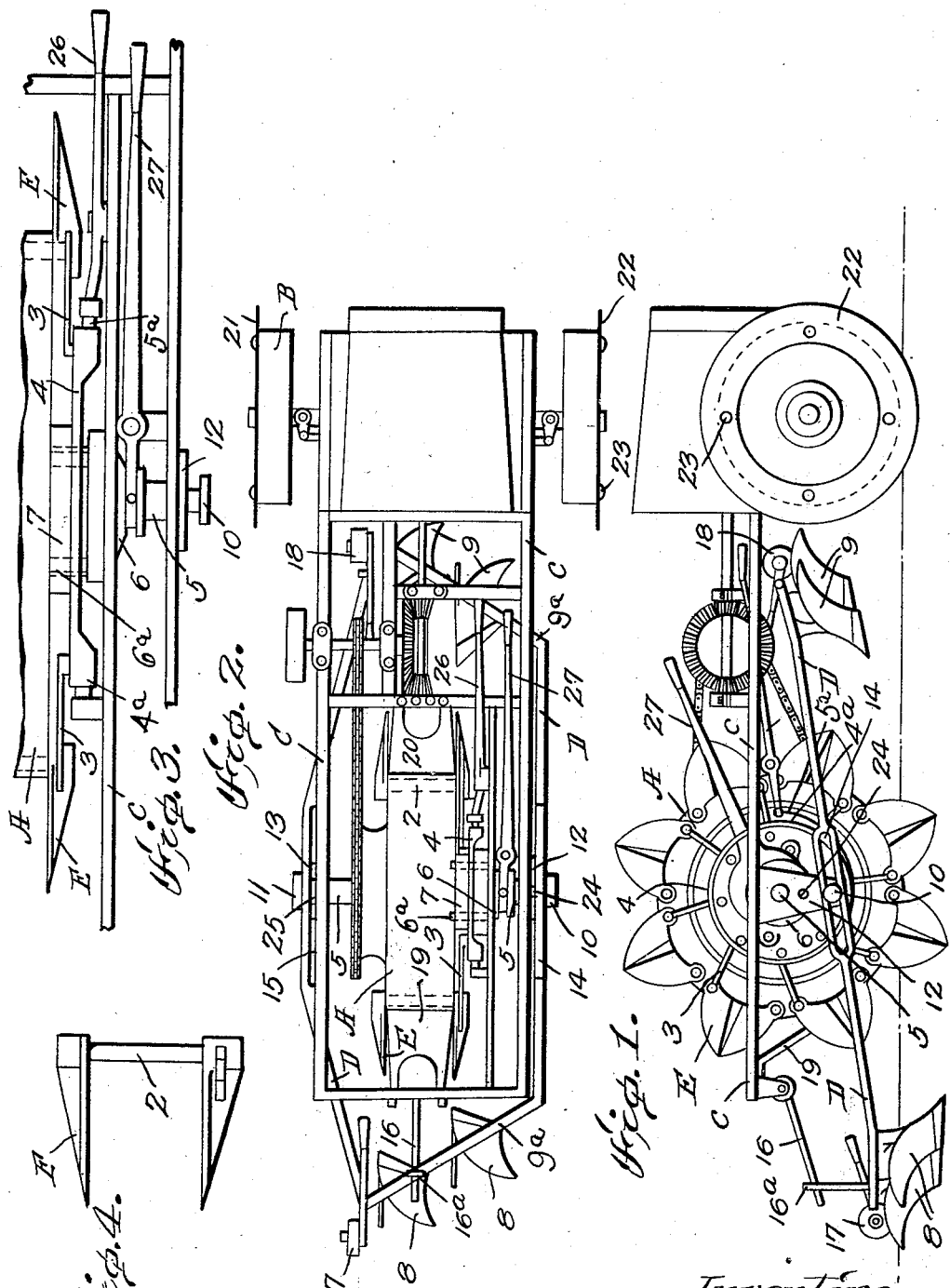

1,858,749

UNITED STATES PATENT OFFICE

WILLIAM PATERSON AND MAY H. PATERSON, OF OAKLAND, CALIFORNIA

MOTOR TRACTION PLOW

Application filed October 14, 1930. Serial No. 488,570.

Our invention consists of a frame or chassis supported by a traction wheel and two steering wheels, said traction wheel having coulters designed to cut the furrows in advance of the plows while traveling backward and forward, said plows consisting of two or more right hand mould board plows and two or more left hand mould board plows. The invention further consists in certain details of construction, all of which will be more fully explained by referring to the accompanying drawings in which Fig. 1 is a side elevation showing the chassis, the traction wheel, the steering wheels, and the plow frame and plows mounted upon the chassis.

Fig. 2 is a top view of the same.

Fig. 3 is an enlarged top view in part of the brake mechanism.

Fig. 4 is an enlarged view in part of the coulters.

The object of our invention is to obtain traction through the action of the coulters on the traction wheel at the same time relieving the drag of the plows by cutting the furrows in advance of the plows and to penetrate the subsoil.

A further object is to furnish a back and forth plowing machine that does not require to be turned around at the end of the field and to be especially adapted to side hill plowing.

Similar reference numerals throughout the drawings refer to similar parts.

A represents the drive wheel, BB the steering wheels, C the chassis, D the plow frame, E the coulters. The coulters E are fixed in pairs to rocking shafts 2, which are journalled in boxes fixed on the interior face of the traction wheel A, said coulters being capable of being projected or retracted by means of connecting rods, 3, which are connected to a disk 4, turnably mounted upon the traction wheel axle 5. A brake band 4a is formed upon the periphery of said disk 4.

A brake consisting of a half circle brake-strap 5a is fixed to the chassis at one of its ends, the other end of said brake-strap being pivotally connected to the short end of the brake lever 26. A clutch 6 having pins 6a attached is slidably mounted upon axle 5, said pins 6a being adapted to project through holes in the disk 4 and to further project through corresponding holes in the hub 7 of the traction wheel A. When the machine moves forward, the clutch being out and the brake 5a applied, the coulters E will be projected outwardly and are held rigid by inserting the clutch 6, having the pins 6a attached, into the holes 7 in the traction wheel hub.

In moving the machine backward and releasing the clutch 6 and applying the brake-strap 5a the coulters E will be retracted inwardly and be held in that position by inserting the clutch pins 6a into holes 7 in the traction wheel A.

The plow frame D comprising two parallel plow beams connected at each of their ends by a cross bar 9a, at a suitable angle forming a bench to receive plow standards. Two or more right hand plows 8, 8, being mounted on said cross bar 9a at one end of said plow frame D, and two or more left hand plows 9, 9, mounted upon said cross bar 9a at the other end of said plow frame D.

Slotted holes 14 and 15 are formed in each of said plow beams midway between said sets of plows, said slotted holes 14 and 15 being in alignment with said plow beams and designed to slide upon wrist pins 10 and 11, which are fixed to arms 12 and 13, depending from the chassis C.

Said plow beams and cross bars 9a having the plows 8, 8, and 9, 9, mounted thereon form an integral plow frame D.

When the plows 8, 8, are deeply engaged in the ground the machine traveling in one direction, by reversing the machine the wrist pins 10 and 11 will glide along the slots 14 and 15, thus raising the plows 8, 8, out of the ground, and by reason of the counterbalance lower the plows 9, 9, into the ground automatically.

A guide rod 16 is hinged to the chassis C, adapted to pass through an eyelet 16a, which is fixed to the plow frame D, holds the plow frame in alignment with the chassis C, causing the plow points to follow in the cuts made by the coulters E, when the machine is traveling in either direction.

The adjustable gauge wheels 17 and 18 gauge the depth of the plowing. The outer face of the traction wheel A being smooth, wheel scrapers 19 and 20 are fixed to the chassis C and interposed between the coulters E, so as to keep the drive wheel A and coulters E from clogging while the machine is traveling in either direction.

The slotted holes 23, formed in the antiskid disks 21 and 22, are for speedy attachment and removal from the outside of the steering wheels BB. The fastening tap bolts having elongated heads are adapted to pass through said slotted holes 23, then turned across the holes 23. By raising the wrist pins 10 and 11 to holes 24 and 25, on depending arms 12 and 13, the plow frame and all of the plows will swing clear off the ground for transportation.

It will be seen that the brake mechanism besides manipulating the coulters also serves as a safety brake when the tractor is run on the highway. The steering wheel mechanism is of the automobile type. In a two furrow and one drive wheel machine a differential can be dispensed with. Disk plows may be substituted for mould board plows.

Having thus described our invention, what we claim as new is:

1. In a motor traction plow, a chassis supported by a traction wheel and two steering wheels, said traction wheel having movable coulters fixed in pairs to rocking shafts, said rocking shafts being journalled in boxes fixed on the inner face of said traction wheel, a disk turnably mounted upon the axle of said traction wheel, a brake band formed upon the periphery of said disk, connecting rods connecting said disk with said coulters on one side of said traction wheel; a slidable clutch mounted upon said axle, said clutch having pins attached, adapted to project through holes in said disk and engage in corresponding holes in the hub of said traction wheel and a brake-strap and brake lever applicable to said disk.

2. In a motor traction plow, a chassis supported by a traction wheel and two steering wheels, said traction wheel having movable coulters fixed in pairs to rocking shafts, said rocking shafts being journalled in boxes fixed on the inner face of said traction wheel, each coulter swinging flush with the outer edges of said traction wheel; a disk turnably mounted upon the axle of said traction wheel; a brake band formed on the periphery of said disk, connecting rods connecting said disk with said coulters on one side of said traction wheel; a slidable clutch mounted upon said axle, said clutch having pins attached, adapted to pass through holes in said disk and engage in corresponding holes in the hub of said traction wheel, a two way plow frame comprising two parallel plow beams integrally connected by cross bars at suitable angles at each end of said plow beams, two or more right hand plows mounted upon said cross bars at one end of said plow frame and two or more left hand plows mounted upon said cross bar; at the other end of said plow frame a slotted hole in each of said plow beams formed midway between said sets of plows, said slots running parallel with said plow beams, wrist pins fixed to arms depending from each side of said chassis, said slots in said plow beams being adapted to slide on said wrist pins, and adjustable gauge wheels mounted on the land side of each gang of plows.

3. In a motor traction plow, a chassis supported by a traction wheel and two steering wheels, said traction wheel having movable coulters fixed in pairs to rocking shafts, said rocking shafts being journalled on the inner face of said traction wheel, each coulter swinging flush with the outer edges of said traction wheel; a disk turnably mounted upon the axle of said traction wheel; a brake band formed on the periphery of said disk, connecting rods connecting said disk with said coulters on one side of said traction wheel; a slidable clutch mounted upon said axle, said clutch having pins attached, adapted to pass through holes in said disk and engage in corresponding holes in the hub of said traction wheel, a guide rod hinged to said chassis rigid laterally, but capable of up and down movement, said rod being adapted to slide within an eyelet fixed to said plow frame, designed to keep the plow frame in alignment with said chassis.

4. In a motor traction plow, a chassis supported by a traction wheel and two steering wheels, said traction wheel having movable coulters fixed in pairs to rocking shafts, said rocking shafts being journalled in boxes fixed on the inner face of said traction wheel, each coulter swinging flush with the outer edges of said traction wheel; a disk turnably mounted upon the axle of said traction wheel; a brake band formed on the periphery of said disk, connecting rods connecting said disk with said coulters on one side of said traction wheel; a slidable clutch mounted upon said axle, said clutch having pins attached, adapted to pass through holes in said disk and engage in corresponding holes in the hub of said traction wheel, a two way plow frame comprising two parallel plow beams integrally connected by cross bars at suitable angles at each end of said plow beams, two or more right hand plows mounted upon said cross bars at one end of said plow frame and two or more left hand plows mounted upon said cross bar; at the other end of said plow frame a slotted hole in each of said plow beams formed midway between said sets of plows, said slots running parallel with said plow beams, wrist pins fixed to arms depending from each side of said chassis, said slots in said plow beams being adapted to slide on said wrist pins, adjustable gauge wheels mounted on the land side of each gang of plows, a pair of wheel scrapers fixed to said chassis, one in front and one in rear of said traction wheel, said scrapers being interposed between said coulters adapted to keep the face of the traction wheel and coulters clean while the tractor is traveling in either direction.

5. In a motor traction plow, a chassis supported by a traction wheel and two steering wheels, said traction wheel having movable coulters fixed in pairs to rocking shafts, said rocking shafts being journalled in boxes fixed on the inner face of said traction wheel, each coulter swinging flush with the outer edges of said traction wheel; a disk turnably mounted upon the axle of said traction wheel; a brake band formed on the periphery of said disk, connecting rods connecting said disk with said coulters on one side of said traction wheel; a slidable clutch mounted upon said axle, said clutch having pins attached, adapted to pass through holes in said disk and engage in corresponding holes in the hub of said traction wheel, a two way plow frame comprising two parallel plow beams integrally connected by cross bars at suitable angles at each end of said plow beams, two or more right hand plows mounted upon said cross bars at one end of said plow frame and two or more left hand plows mounted upon said cross bar; at the other end of said plow frame a slotted hole in each of said plow beams formed midway between said sets of plows, said slots running parallel with said plow beams, wrist pins fixed to arms depending from each side of said chassis, said slots in said plow beams being adapted to slide on said wrist pins, adjustable gauge wheels mounted on the land side of each gang of plows, slotted holes formed in antiskid disks being for speedy attachment and removal from the outside of the steering wheels, the fastening tap bolts having elongated heads adapted to pass through said slotted holes and turned across said holes.

WILLIAM PATERSON.
MAY H. PATERSON.